May 12, 1970          R. E. JONES          3,512,044
OVER AND UNDER VOLTAGE PROTECTION CIRCUIT
Filed Aug. 11, 1967
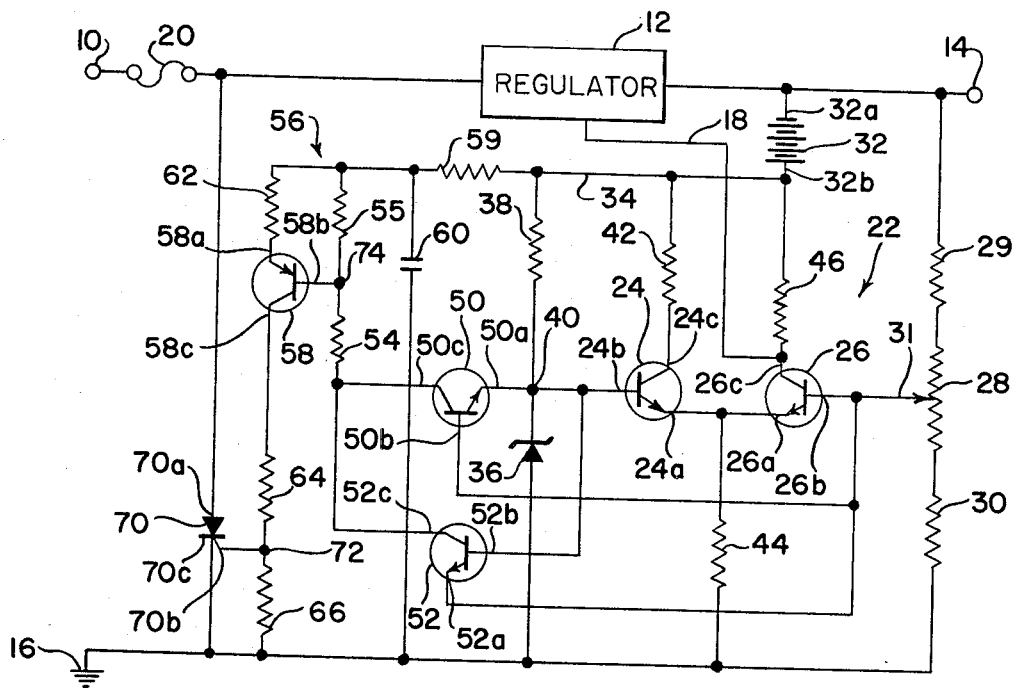
INVENTOR
ROBERT E. JONES
BY
Oberlin, Maky, Donnelly & Renner
ATTORNEYS

United States Patent Office 3,512,044
Patented May 12, 1970

3,512,044
OVER AND UNDER VOLTAGE PROTECTION CIRCUIT
Robert E. Jones, Wesleyville, Pa., assignor to Elgin Electronics, Inc., Waterford, Pa., a corporation of Ohio
Filed Aug. 11, 1967, Ser. No. 659,927
Int. Cl. G05f 1/58
U.S. Cl. 317—16                    10 Claims

ABSTRACT OF THE DISCLOSURE

A transistorized circuit sensing operation of a differential amplifier control stage of a voltage regulator in over and under voltage conditions, to trigger a silicon controlled rectifier, and cause destruction of a replaceable fuse element protecting the regulator circuit.

---

This invention relates to voltage regulating circuits and more particularly to voltage regulators which utilize a differential amplifier as the control stage for sensing the output of the regulator, comparing it with a reference standard and controlling the action of the regulator to maintain the output voltage at a predetermined value.

This invention utilizes the fact that a semiconductor device may be changed from its nonconducting to its conducting state by a small voltage variation at its control electrodes. The voltage variation may be selected to some extent to be compatible with voltage differentials existing in a regulator circuit which are the desired extremes of normal operating conditions. It is often necessary in such voltage regulators to have both upper and lower limiting levels of voltage output, any operation beyond these levels to be terminated in order to prevent destruction or impairment of circuits utilizing the regulated voltage or of damage to the voltage regulator itself due to operation outside of the design range. In a voltage regulator utilizing a differential amplifier stage, the base of the control transistor is maintained at approximately the same voltage as the base of the reference transistor and it is advantageous to be able to monitor these two voltage levels to determine when an excessive differential occurs thereby indicating an output voltage outside of the normal operating range. It is usual in any voltage regulator that the circuit be protected by a common fusible element and this invention is particularly advantageous in utilizing this element, in addition to its normal function, as a part of the means for disconnecting the regulator when abnormal conditions prevail.

It is an object of this invention to provide an over and under voltage protection circuit for use with variable voltage regulators in which no adjustment is required of the protection circuit for different output voltage levels.

It is another object of this invention to provide an improved over and under voltage protection circuit which prevents erroneous triggering of the protection circuit when the output voltage of the regulator circuit is adjusted to different voltage levels.

It is still another object of this invention to provide an improved over and under voltage protection circuit which utilizes fewer components than possible heretofore and which cooperates with a usual protection device for the circuit to eliminate the application of voltage when the regulator circuit is caused to operate outside its normal design range.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

The annexed drawing is a schematic electrical diagram showing the preferred embodiment of the invention.

An unregulated DC voltage is applied to the input terminal 10 of this circuit and it is desired that the regulator 12 maintain the voltage at the output terminal 14 at a constant level for application to a load device. In this embodiment of the invention, a positive potential is applied to the input terminal 10 and a positive output voltage is realized at the output terminal 14. However, it will be understood by those skilled in the art that suitable modifications in the circuitry can be made for utilization of the circuit with negative voltages as well. A common ground 16 is shown for the input and output voltages and as a point of reference for the regulator and protection circuit.

The regulator 12 is shown in block form in the drawing as indicative of any type of regulator which might control a varying input voltage to provide a constant level of output voltage. The regulator 12 is shown in a series regulation configuration, however, it will be understood that other types of regulators will be utilizable with this invention. One example of a device which may be used for the regulator 12 would be a NPN power transistor connected in series between the input and output terminals 10, 14 with the collector connected to the input terminal 10 and the emitter to the output terminal 14 to provide a voltage drop across the transistor to maintain the output voltage at a regulated value. Line 18 would be connected to the base of the transistor and would supply a control voltage varying the impedance of the transistor and thus the voltage drop thereacross. In any of these types of regulating devices, it will be assumed that the lead 18 supplies the control voltage to such device to regulate its voltage varying characteristics.

A fuse 20 is connected in series between the input terminal 10 and the regulator 12 to prevent against short circuits and abnormal over-current flow through the regulator 12 in a manner quite standard in the art. As will be pointed out in more detail hereinafter, the fuse 20 is also an important component in the over and under voltage protection circuit for the regulator 12. The fuse 20, which is schematically shown in the drawing, in its most common configuration would comprise a destructible conductive link rated for a particular current value, however, it will be obvious to use other devices for this fuse 20 such as, for example, resettable circuit breakers, voltage actuated relay trip breakers and the like.

This invention is particularly applicable to differential amplifier control of a voltage regulator and such a differential amplifier control stage 22 consisting of a reference transistor 24 and a control transistor 26 is shown associated with the regulator 12. A voltage divider is connected between the output terminal 14 and ground 16 and consists of a potentiometer 28 connected in series with two resistors 29, 30 which allow the potentiometer 28 to operate in a selected range of voltages which are a proportion of the output voltage of the regulator circuit. The voltage derived from the slider 31 of the potentiometer 28 is thus a proportion of the voltage at the output terminal 14, and the setting of the slider 31 of the potentiometer 28 as will be pointed out in greater detail, determines the level of the output voltage of the regulator 12. A battery 32 is shown with its negative terminal 32a connected to the output terminal 14 and its positive terminal 32b connected to provide a bias voltage on a common line 34 for application to the differential amplifier control stage 22 and the remainder of the protection circuitry.

A Zener diode 36 is connected between ground 16 and the bias line 34 in series with a resistor 38 to provide a reference voltage for the differential amplifier circuit at junction 40. Junction 40 is connected to the base 24b of the reference transistor 24 to provide a constant potential at the base lead 24b. The collector 24c of the reference transistor 24 is connected to the bias line 34 through a resistor 42 and the emitter 24a is connected to ground 16 through resistor 44. The base 26b of the control transistor 26 is connected to the slider 31 of the potentiometer 28, the collector 26c to the bias line 34 through resistor 46 and the emitter 26a is also connected to ground 16 through resistor 44 which then is in common with the reference and control transistors 24, 26.

Thus, it will be seen that the differential amplifier control stage 22 of the regulator 12 operates in a well-known manner in supplying a voltage on line 18 connected to the collector 26c of transistor 26 for application to the regulator 12 to control the voltage drop across the regulator 12. A typical operating condition would be when the output voltage of the regulator 12 rises a certain extent due to, for example, a sudden decrease in the load connected to the output terminal 14. The voltage at the slider 31 of the potentiometer 28 will rise correspondingly causing a momentary increase in the base 26b to emitter voltage of the control transistor 26, a consequent increase of current flow through the control transistor 26 and a tendency to increase the voltage drop across the common resistor 44. Because the base 24b of the reference transistor 24 is maintained at a fixed potential, the base 24b to emitter 24a voltage of the reference transistor 24 will decrease causing a decrease of current flow through the transistor 24 and a tendency to lower the voltage drop across the common resistor 44. The increased current flow through the control transistor 26 will cause a change in potential at the collector 26c of the transistor 26 to cause a greater voltage drop across the regulator 12 thereby lowering the voltage at the output terminal 14. Such lowered voltage is reflected at the slider 31 of the potentiometer 28 and at the control transistor 26 to repeat the same type of action but in a negative sense until the base 26b of the control transistor 26 is returned to approximately the same voltage as the base 24b of the reference transistor 24. The final difference between the voltages at the bases 26b, 24b of the control and reference transistors 26, 24 will be only slight with the base 26b of the control transistor 26 being slightly higher in value when a quiescent condition is attained.

Similar small voltage differentials between the bases 26b, 24b of the control and reference transistors 26, 24 will be attained for voltage variations in either the input or output voltage waveforms which can be accommodated by the regulator 12 or the remainder of the control system. The only time that this condition does not exist is when too great an over or under voltage occurs that cannot be compensated for by the regulator system. The result will be a substantially greater differential in the base voltages of the control and reference transistors 26, 24 than that occurring within the normal operating range of the regulator 12.

Such an abnormal condition of the differential amplifier control stage 22 of the regulator is detected by a pair of transistors 50, 52 connected between the base leads of the control and reference transistors 26, 24. The over voltage transistor 50 has its emitter 50a connected to the junction 40 and the base 24b of the reference transistor 24 and its base 50b connected to the base 26b of the control transistor 26. The under voltage transistor 52 has its base 52b connected to the base 24b of the reference transistor 24 and its emitter 52a connected to the base 26b of the control transistor 26. The collectors 50c, 52c of the over and under voltage transistors 50, 52 are connected together and to series connected resistors 54, 55 for controlling the bias of an amplifier stage 56. The transistor 58 of the amplifier stage 56 receives its energization from a resistor 59 and condenser 60 filter network connected to the bias line 34 through emitter resistor 62 and base resistor 55, the collector 58c being connected to ground 16 through series resistors 64, 66.

An SCR 70 is shown having its anode 70a connected to the unregulated voltage input terminal 10 through the fuse 20, with its cathode 70c connected directly to ground 16. The gate 70b of the SCR 70 is connected to the junction 72 between the series resistors 64, 66 in the amplifier stage 56. Thus, in normal operation a positive potential will appear across the SCR 70 but it will be prevented from firing due to the absence of sufficient turn-on voltage applied at the gate 70b of the SCR 70.

When sufficient current is conducted from the amplifier stage 56 through the series resistors 64, 66 to ground 16, the potential of the junction 72 between the resistors 64, 66 will rise from a low level to a value sufficient to trigger the SCR into conduction, thereby causing an onrush of current from the input terminal 10 through the fuse 20 and the now conductive SCR 70, to ground 16 causing a burnout of the fuse 20. The current carrying capacity of the fuse 20 is selected to prevent against short circuits and usual overload conditions of the regulator 12 in the normal manner and the excessive current flow through the conducting SCR 70 is more than sufficient to overrate the fuse 20 and cause its burnout.

The transistor 58 in the amplifier stage 56 is of the PNP type and in the normal operating range of the regulator 12 receives insufficient forward bias at the base 58b and emitter 58a electrodes to cause appreciable current flow in the collector circuit. When either the over or under voltage transistor 50, 52 become conducting, however, current flow will occur from the bias line 34 through the series resistors 54, 55 and one of the conducting transistors 50, 52 to cause the potential at the junction 74 between the resistors 54, 55 to be lowered in value. Such lowered potential causes the transistor 58 to be forward biased to cause a high current flow in the emitter-collector circuit of the transistor 58, through resistors 64, 66.

The over and under voltage transistors 50, 52 are of the NPN type and in this embodiment of the invention are silicon type transistors. It is characteristic of the silicon transistor that it will not go into heavy conduction until the base to emitter voltage or the differential in voltages between the base leads 26b, 24b of the control and reference transistors 26, 24 becomes greater than approximately 0.65 volt. Such voltage value is designated the turn-on voltage of the transistor. In the normal operating range of the circuit, the voltage differential will remain lower than this figure or will become greater only during transient intervals of insufficient time duration to cause a triggering of the SCR 70. When an over or under voltage condition exists, the regulator circuit will not be able to return the base 26b of the control transistor 26 to a value within the normal range of within 0.65 volt of the base 24b of the reference transistor 24, thereby causing conduction by either the over or under voltage transistor 50, 52 and a triggering of the SCR 70. Different types of transistors may be utilized for the over and under voltage transistors 50, 52 having different characteristics such as, for example, a germanium type transistor which has a turn-on voltage of approximately 0.35 volt. Such a substitution will alter the normal operating range of the regulator and protection circuit correspondingly and in certain environments may be desirable.

It is also noted that this protection circuit is advantageous in use with variable voltage regulator circuits such as the one shown in the drawing. Thus, if the slider 31 of the potentiometer 28 is moved in an upward direction, a greater percentage of the voltage at the output terminal 14 will appear at the slider 31 of the potentiometer 28 but the base 26b of the control transistor 26 will remain at approximately the level of the base 24b of the reference transistor 24, thereby causing the voltage at the output terminal 14 to have a lower value. It will be appreciated that the loop gain of the regulator and protection circuit is sufficiently high so that variations of the slider 31 setting will cause an immediate change of the base 26b of the control transistor 26 and insufficient energy will be developed by the over and under voltage transistors 50, 52 and amplifier stage 56 to trigger the SCR 70.

It will also be appreciated that the voltage-current characteristics of other devices such as diodes may be utilized in a similar circuit to provide the same type of protection circuitry and the teachings of this invention are intended to cover such variations and are not to be construed as limited to the exact circuit shown.

Other modes of applying the principles of the invention may be employed, change being made as regards the details described, provided the features stated in any of the following claims or the equivalent of such be employed.

I, therefore, particularly point out and distinctly claim as my invention:

1. In combination with a voltage regulator having a differential amplifier stage for controlling output voltage, a circuit for disabling the regulator upon excessive output voltage variations comprising means connected to the input terminals of the differential amplifier stage for sensing the voltage difference thereat, means operatively connected with said sensing means for generating a trigger signal at a predetermined voltage difference, and disabling means operatively connected with the voltage regulator, said disabling means being responsive to the trigger signal to prevent application of power through the voltage regulator.

2. The combination as set forth in claim 1 wherein the voltage regulator is adjustable to various output voltage levels and said circuit is automatically correlated to disable the voltage regulator upon voltage excursions about such output levels.

3. The combination as set forth in claim 1 wherein said means for sensing the voltage difference comprises first means for sensing a voltage difference of one sense, and second means for sensing a voltage difference of the opposite sense, said trigger signal generating means being responsive to at least one of said first and second means for over and under voltage conditions.

4. The combination as set forth in claim 3 wherein said first and second means comprise respectively first and second transistors having base and emitter electrodes connected to the input terminals of the differential amplifier stage, said first transistor being oppositely connected with respect to said second transistor.

5. The combination as set forth in claim 3 wherein said disabling means comprises means in series connection at the input of the voltage regulator for interrupting current flow upon actuation, and a silicon controlled rectifier operatively connected with said interrupting means, said rectifier being responsive to the trigger signal of said generating means for actuating said interrupting means.

6. The combination as set forth in claim 5 wherein said interrupting means is a fuse having a current rating sufficient for the regulator in the normal range of operation and adapted to be overrated by additional current flow through said silicon controlled rectifier.

7. A voltage regulator having automatic disablement for excessive voltage variations comprising input and output terminals for connection to a source of power and a load respectively, means in connection between said input and output terminals for regulating the voltage at said output terminals in response to a control signal, a reference source of voltage, a differential amplifier operatively connected with said regulating means for developing the control signal, said differential amplifier having first and second input terminals, said first input terminal being connected to said reference source of voltage, said second input terminal being operatively connected to said regulator output terminal, means connected to said first and second input terminals of said differential amplifier for sensing the voltage difference therebetween, means operatively connected with said sensing means for developing a further signal at a predetermined voltage difference, and means operatively connected with said input terminals of the voltage regulator for preventing the application of voltage to said regulating means in response to such further signal.

8. A voltage regulator as set forth in claim 7 further including a variable voltage divider connected across said output terminals of the voltage regulator for developing a voltage at the divider tap proportional to the voltage at said output terminals, said divider tap being connected to said second input terminals of said differential amplifier for adjustment of the output voltage of the voltage regulator.

9. A voltage regulator as set forth in claim 8 wherein said sensing means comprises a first transistor having base and emitter electrodes connected to said differential amplifier input terminals, and said preventing means comprises voltage shunting means operatively connected across the input of said regulating means, said shunting means being switched to a low impedance value in response to sufficient current from the collector of said first transistor.

10. A voltage regulator as set forth in claim 9 further including a second transistor having base and emitter electrodes reversely connected to said differential amplifier input terminals with respect to said first transistor, and a collector connected in common with the collector of said first transistor, said shunting means being responsive to current flow from one of said collectors to prevent application of voltage to said regulating means.

References Cited

UNITED STATES PATENTS

| | | |
|---|---|---|
| 2,925,548 | 2/1960 | Scherer. |
| 3,005,147 | 10/1961 | Thomas _____ 323—9 |
| 3,359,434 | 12/1967 | Galluzzi. |

LEE T. HIX, Primary Examiner

G. GOLDBERG, Assistant Examiner

U.S. Cl. X.R.

317—31, 33; 323—9, 22